US008430189B2

(12) United States Patent
Tallino

(10) Patent No.: US 8,430,189 B2
(45) Date of Patent: Apr. 30, 2013

(54) POWER ADD-ON DEVICE FOR MANUAL WHEELCHAIR

(76) Inventor: Patrick Tallino, Lake Elsinore, CA (US)

( * ) Notice: Subject to any disclaimer, the term of this patent is extended or adjusted under 35 U.S.C. 154(b) by 266 days.

(21) Appl. No.: 12/788,147

(22) Filed: May 26, 2010

(65) Prior Publication Data

US 2010/0300777 A1 Dec. 2, 2010

Related U.S. Application Data

(60) Provisional application No. 61/181,602, filed on May 27, 2009.

(51) Int. Cl.
*B60K 1/02* (2006.01)
*A61G 5/10* (2006.01)

(52) U.S. Cl.
USPC ............... 180/11; 180/15; 180/12; 280/304.1

(58) Field of Classification Search ................. 180/68.5, 180/15, 65.1, 22, 907, 12, 13, 214; 188/2; 267/229, 165, 158, 262, 46, 45, 43, 41; 403/381
See application file for complete search history.

(56) References Cited

U.S. PATENT DOCUMENTS

| | | | | |
|---|---|---|---|---|
| 4,759,418 | A | 7/1988 | Goldenfeld et al. | |
| 5,050,695 | A | 9/1991 | Kleinwolterink et al. | |
| 5,113,959 | A | 5/1992 | Mastov et al. | |
| 5,125,468 | A | 6/1992 | Coker | |
| 5,135,063 | A | 8/1992 | Kropf | |
| 5,222,567 | A * | 6/1993 | Broadhead et al. | 180/15 |
| 5,234,066 | A | 8/1993 | Ahsing et al. | |
| 5,350,032 | A | 9/1994 | Smith | |
| 5,351,774 | A * | 10/1994 | Okamoto | 180/65.1 |
| 5,494,126 | A | 2/1996 | Meeker | |
| 5,495,904 | A | 3/1996 | Zwaan et al. | |
| 5,651,422 | A | 7/1997 | Casali | |
| 5,988,304 | A | 11/1999 | Behrendts | |
| 6,059,060 | A | 5/2000 | Kanno et al. | |
| 6,481,514 | B2 * | 11/2002 | Takada | 180/11 |
| 6,766,871 | B2 | 7/2004 | Sawyer | |
| 6,860,347 | B2 | 3/2005 | Sinclair et al. | |
| 6,896,079 | B1 | 5/2005 | Axelsson | |
| 6,935,448 | B2 * | 8/2005 | Goertzen et al. | 180/65.1 |
| 7,032,917 | B1 * | 4/2006 | Chelgren | 280/304.1 |
| 7,104,346 | B2 | 9/2006 | Schaffner | |
| 2002/0088657 | A1 | 7/2002 | Brett et al. | |

* cited by examiner

*Primary Examiner* — Tony H. Winner
*Assistant Examiner* — Jacob Knutson
(74) *Attorney, Agent, or Firm* — Knobbe, Martens, Olson & Bear LLP

(57) ABSTRACT

A power add-on device for powering a manual wheelchair includes a motorized component including dual electric motors and a power source electrically coupled to the electric motors, wherein each of the motors is configured to turn a respective one of a set of drive wheels. The power add-on device includes a latching mechanism adapted to attach the power add-on device to the camber tube of the manual wheelchair; and a controller, reachable by a person sitting in the manual wheelchair, that controls the latching mechanism, the motors, and a swing arm that allows the rear wheels of the manual wheelchair to be lifted off the ground. The front wheels of the manual wheelchair are allowed to be lifted several inches off the ground to avoid obstacles, or can be lifted by the user leaning back. Advantageously, the power add-on device can be detached from the manual wheelchair and loaded into the trunk of a car when travelling or may be checked in as baggage when flying.

50 Claims, 10 Drawing Sheets

POWER ADD-ON DEVICE FOR MANUAL WHEELCHAIR

CROSS-REFERENCE TO RELATED APPLICATIONS

The present application is related to and claims priority from prior provisional application Ser. No. 61/181,602 filed by Patrick Tallino on May 27, 2009 and entitled "Power Add-On Device For Manual Wheelchair", the contents which are incorporated herein by reference.

FIELD OF THE INVENTION

The present invention relates to an auxiliary power add-on attachment for a manual rigid-framed wheelchair.

BACKGROUND

Most spinal cord-injured individuals with injury levels from the five cervical vertebrate down to the lumbar vertebrates use a lightweight rigid framed manual wheelchair for everyday use. However, lengthy outings or ones that require traversing uneven or sloped terrain are unrealistic and often impossible for many using manual chairs. Although electric-powered wheelchairs exist that can be used for those situations, they are not generally prescribed unless the user lacks the ability to use a manual wheelchair. Moreover, electric-powered wheelchairs tend to be expensive, heavy, and cumbersome.

Several patents disclose devices which can be attached to a manual wheelchair to electrically power the chair. For example, U.S. Pat. No. 5,494,126 to Meeker, entitled "Apparatus and Method For Attaching a Motorized Wheel to a Wheelchair", discloses a motorized wheel that can be attached to the front of a wheelchair. As another example, U.S. Pat. No. 5,496,904 to Zwaan, entitled "Wheelchair Power System", discloses a power system that can be added to a manual wheelchair to convert it to an electric-powered wheelchair.

Although such devices are somewhat useful and beneficial, the existing technology fails to provide an easy way to attach/detach a power add-on device to a conventional manual wheelchair. Furthermore, such devices fail to provide for traversal over rough terrain and adequate stability. Additionally, many such devices require modification to the manual wheelchair. Accordingly, it would be desirable and highly advantageous for there to be an auxiliary power add-on attachment for a manual wheelchair that overcomes these and other deficiencies.

SUMMARY OF THE INVENTION

In an embodiment of the present invention, a power add-on device for powering a manual wheelchair includes a motorized component including dual electric motors and a power source electrically coupled to the electric motors, wherein each of the motors is configured to turn a respective one of a set of drive wheels. The power add-on device includes a latching mechanism adapted to attach the power add-on device to the camber tube of the manual wheelchair; and a controller, reachable by a person sitting in the manual wheelchair, that controls the latching mechanism, the motors, and a swing arm that allows the rear wheels of the manual wheelchair to be lifted off the ground.

Attachment of the wheelchair to the power add-on device is accomplished simply by backing up the wheelchair into the device. To reduce tipping, the power add-on device features a front anti-tip castor wheel and a back anti-tip castor wheel. When the power add-on device is attached to the wheelchair, the front wheels can be lifted several inches off the ground when encountering obstacles or by the user leaning back. A notable design feature of the present invention is that the latching mechanism is not tightly clamped down on the camber tube; instead, it rather surrounds the camber tube, allowing the camber tube to rotate slightly as the wheelchair tilts to allow the front wheels of the manual wheelchair to be lifted. Advantageously, the power add-on device can be detached from the manual wheelchair and loaded into the trunk of a car when travelling or may be checked in as baggage when flying.

In an embodiment of the present invention, the latching mechanism includes a clamshell latching mechanism. In this embodiment, the clamshell latching mechanism includes an upper clamshell portion and a bottom clamshell portion, the upper clamshell portion and the bottom clamshell portion attached by a hinge. When the clamshell latching mechanism is in a closed position, the clamshell latching mechanism surrounds the camber tube of the manual wheelchair.

These and other aspects, features, and advantages of the present invention will become apparent from the following detailed description of preferred embodiments, which is to be read in connection with the accompanying drawings.

DETAILED DESCRIPTION

Figure 1:
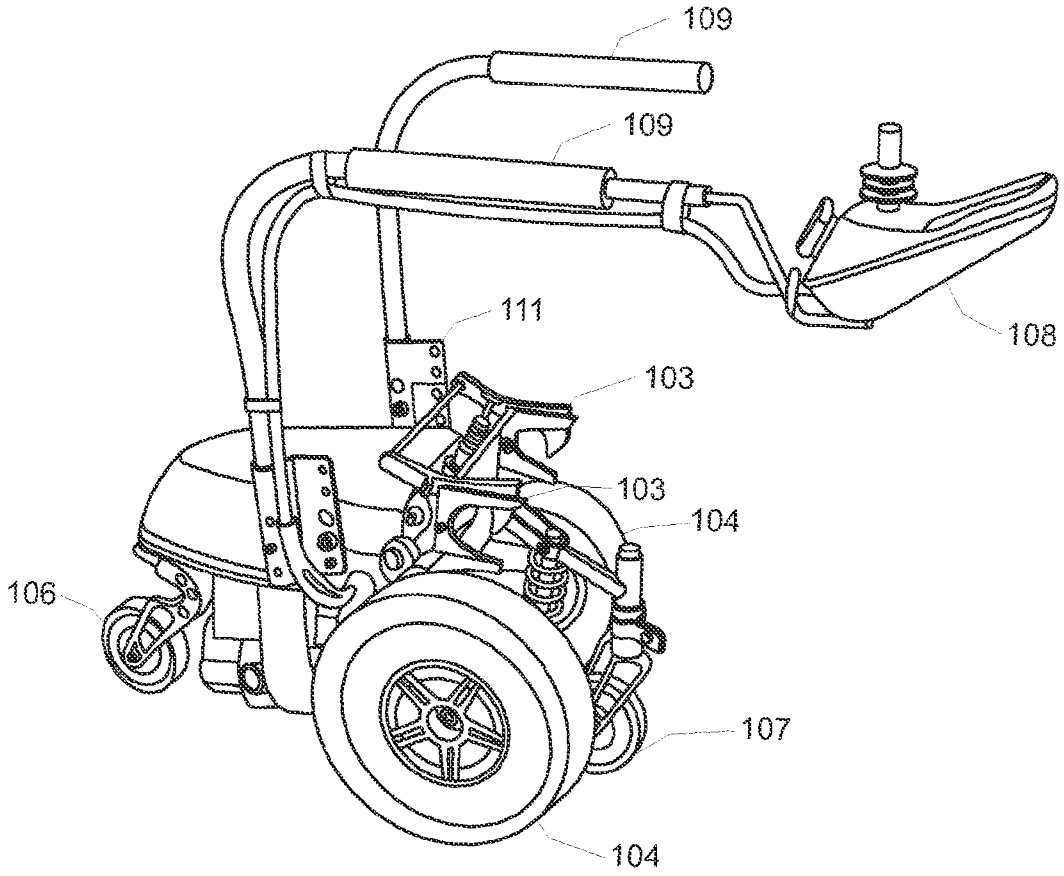
FIG. 1 shows an exemplary power add-on device for a manual wheelchair, in accordance with a preferred embodiment of the present invention.
Figure 2A:
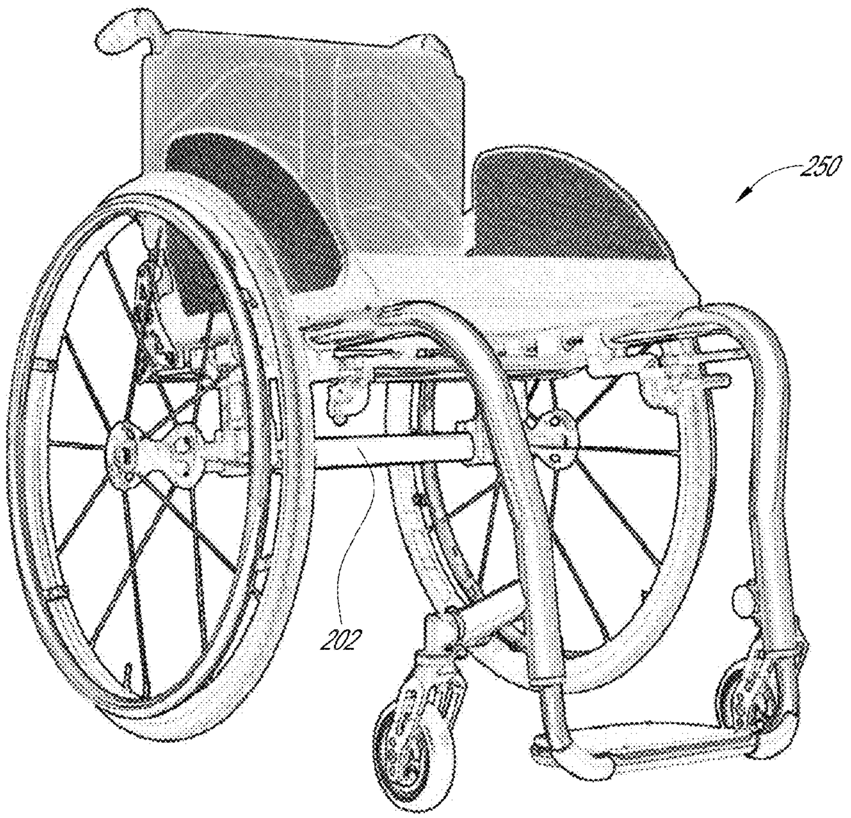
FIG. 2A shows a conventional manual wheelchair having a camber tube.
Figure 2B:
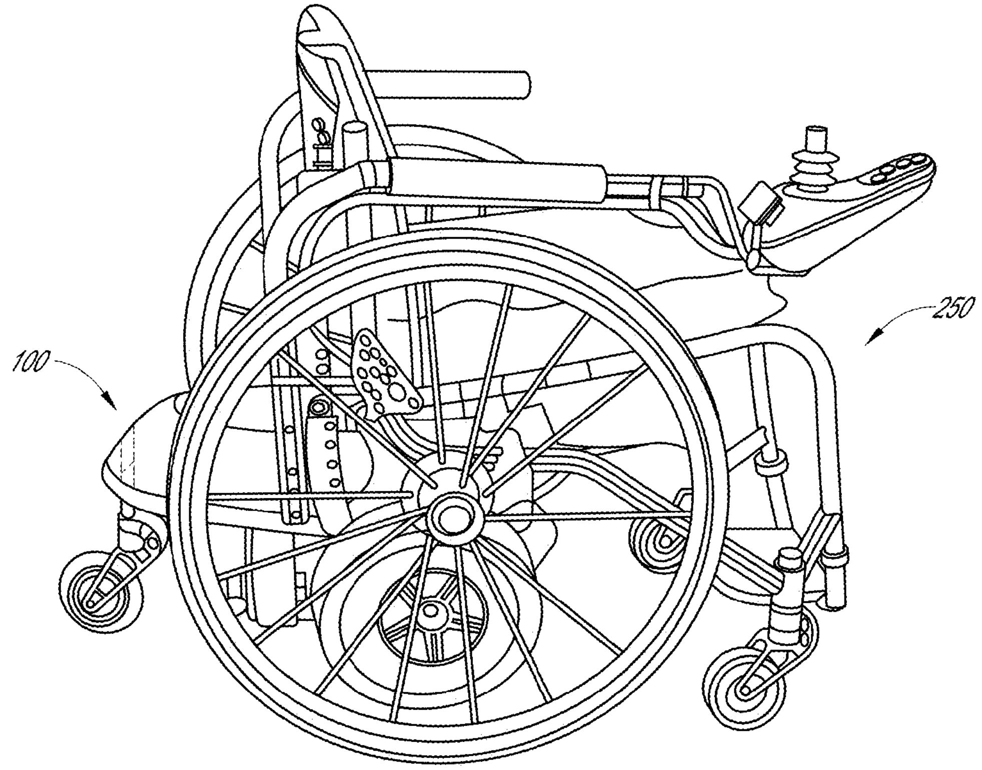
FIG. 2B shows the power add-on device of FIG. 1 attached to a conventional manual wheelchair.

FIG. 1 illustrates an exemplary power add-on device 100 useable for powering a manual wheelchair, in accordance with a preferred embodiment of the present invention. FIG. 2B illustrates the power add-on device 100 attached to a manual wheelchair 201 having a camber tube 202. The power add-on device 100 includes a housing 102. The housing 102 includes, therein, two conventional electric wheel-chair motors that are electrically coupled to a power source, and are arranged so that each drives a wheel 104. The manual wheelchair 201 can be attached to the power add-on device 100 simply by backing up the manual wheelchair 201 until a pair of latches 103 holds the camber tube of the manual wheelchair 201. Advantageously, no modification is required to the manual wheelchair 201.

Preferably, the latches 103 can be activated by an electric actuator so that when a user wants to de-couple the power add-on device 100 from the manual wheelchair 250, the user employs remote control 108 to activate the electric actuator so that the latches 103 assume an open position, releasing the manual wheelchair 250. Preferably, the remote control 108 is a conventional joystick or other such user-friendly remote control device.

Preferably, the power add-on device 100 can also be released manually, for example, by pulling a lever.

Preferably, the power add-on device 100 has built in recline and anti-tip features so the user can recline and relieve pressure from their seat cushion safely which is very important in order to avoid pressure sores. Preferably, the anti-tip feature is at least in part accomplished by employing front anti-tip castor wheel 107 and rear anti-tip castor wheel 106.

When the power add-on device 100 is attached to the manual wheelchair 250, the front anti-tip castor wheel 107 can be lifted several inches off the ground when encountering obstacles (preferably, as much as three inches). A notable design feature of the present invention is that the latches 103 are not tightly clamped down on the camber tube; instead, the latches 103 rather surround the camber tube, allowing the camber tube to rotate slightly as the manual wheelchair 250 tilts to allow the front wheels of the manual wheelchair to lift of the ground when encountering obstacles or when the user wishes to recline.

Preferably, the power add-on device 100 includes built-in armrests 109 on which the remote control 108 is mounted which operates the device. Preferably, the armrests 109 are mounted to the housing 102 using brackets 111, as shown.

Figure 3:
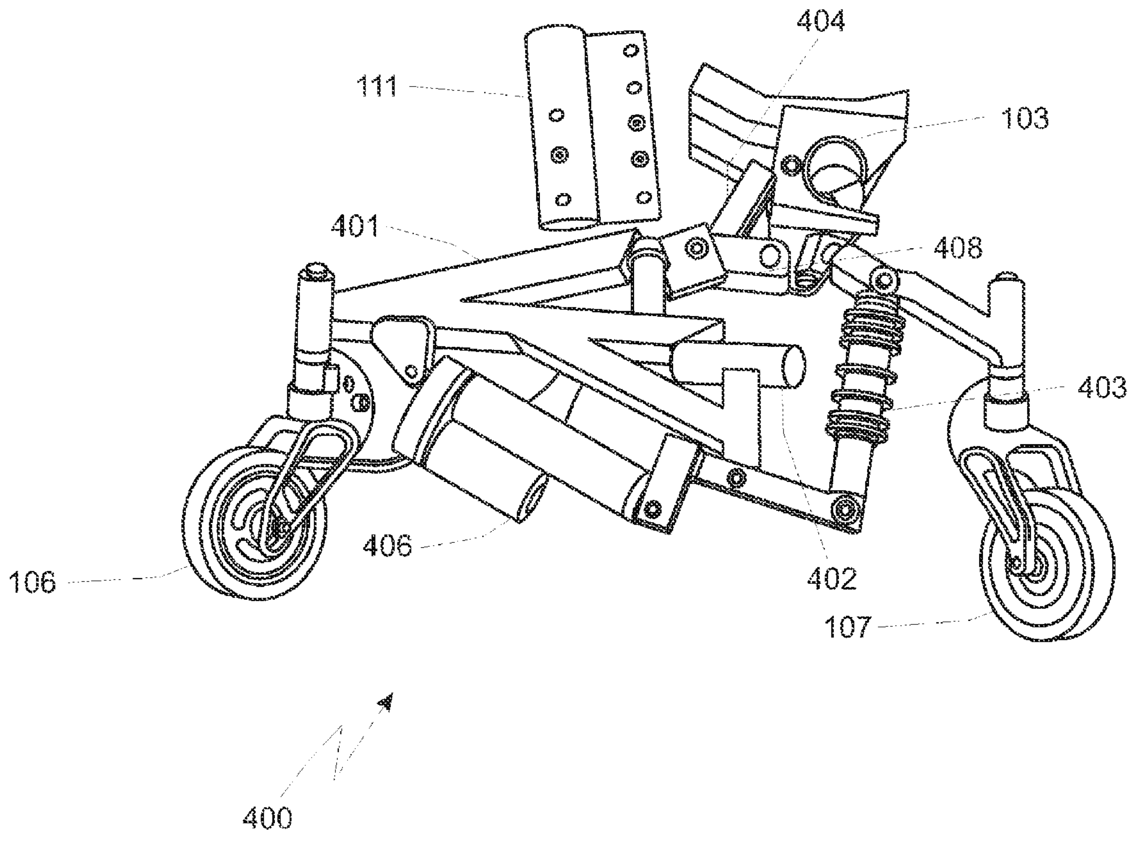
FIG. 3 shows the frame structure of the power add-on device of FIG. 1.
Figure 4:
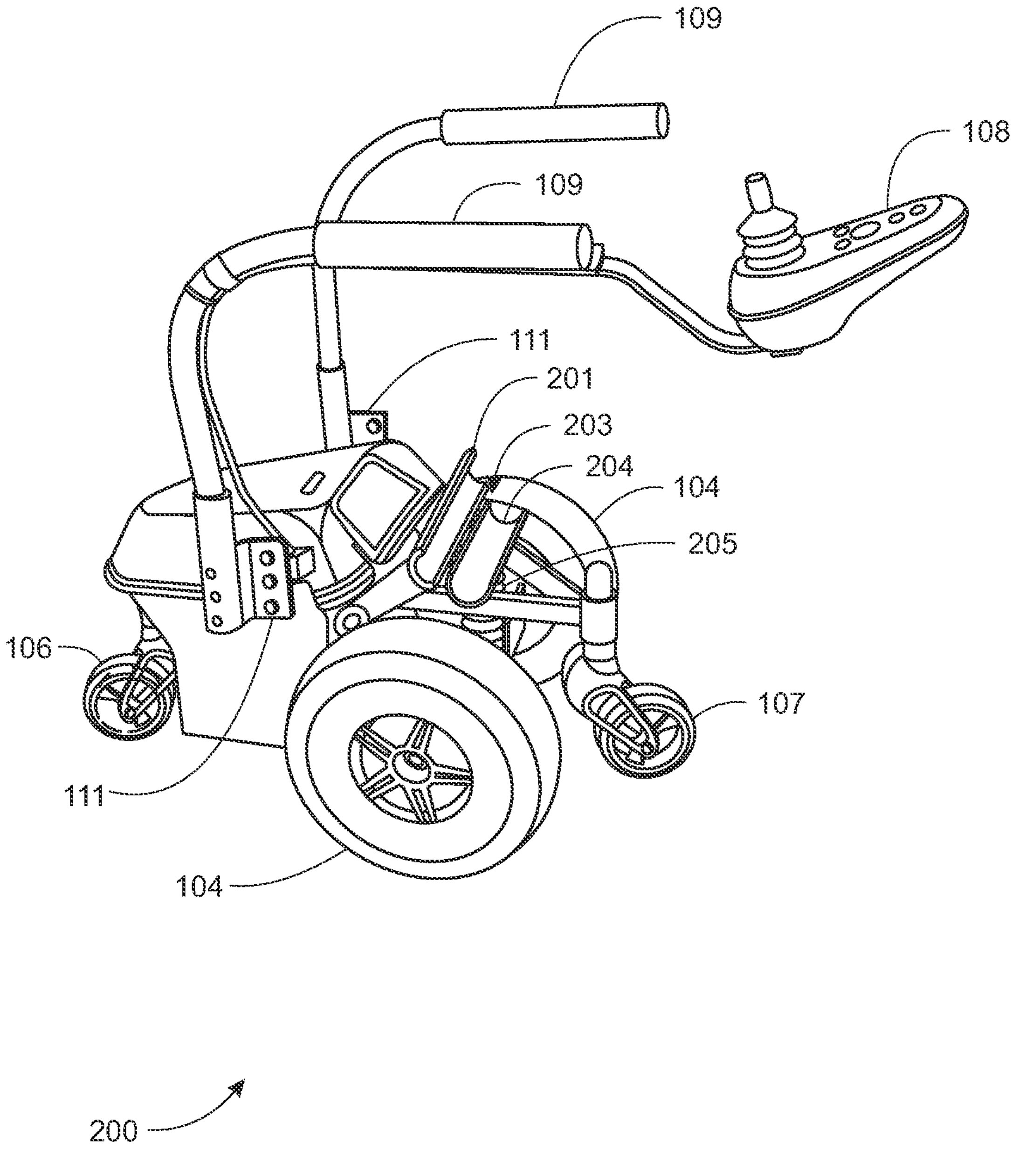
FIGS. 4 to 6 show an exemplary power add-on device for a manual wheelchair, in accordance with another preferred embodiment of the present invention.

Referring to FIG. 3, the framing structure 400 of the power add-on device 100 is shown. As depicted in FIG. 4, the framing structure 400 includes body frame 401, motor mount 402 (for securely holding the electric motors), coil-over shock absorber 403, rear anti-tip castor wheel 106 and front anti-tip castor wheel 107 (to prevent tipping, as discussed above), combination electric actuator 404 and latches 103 (to open the latching system and release the manual wheelchair 201, as discussed above), armrest mounts 111 (to secure the pair of armrests 109), and combination electric actuator 406/swing arm 408 (to allow the swing arm 408 to pivot upwardly, thereby raising the rear wheels of the manual wheelchair 250 off the ground and transferring the weight of the user from the rear wheels of the manual wheelchair through the shock-absorbed swing arm to provide traction to the power add-on's drive wheels). However, even when the rear wheels of the manual wheelchair 250 are positioned on the ground, relatively level terrain may still be traversed easily because the powered drive wheels 104 are lined up with the wheels of the manual wheelchair 250. In general, the higher the rear wheels of the manual wheelchair 250 are raised, the larger the obstacles that can be traversed. An additional benefit of this design is that it enables the user the advantage of additional height and reach capabilities for different everyday tasks.

Figure 5:
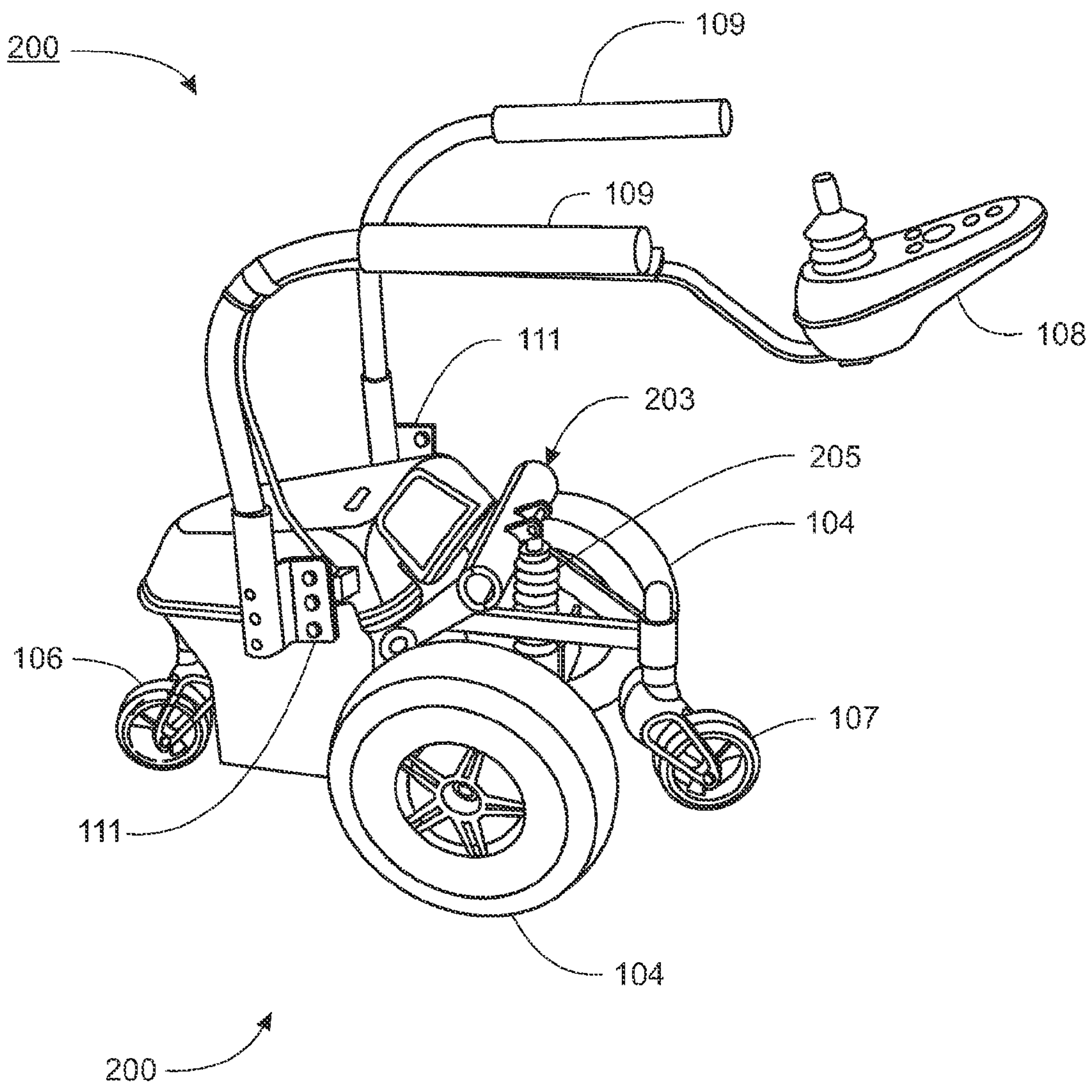
Figure 6:
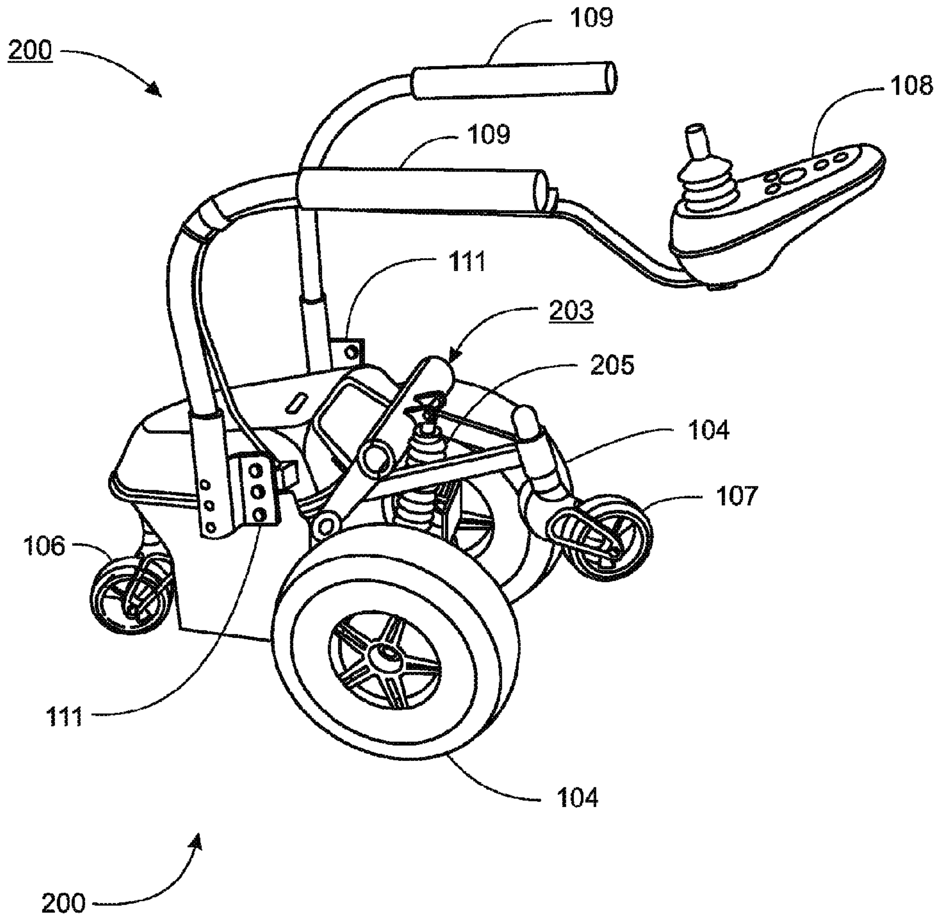

FIG. 4 Shows an alternate and preferred latching mechanism wherein the user backs up to an upper clamshell 201 of the latch 203 and then employs the remote control 108 to activate an electric actuator to close the latch 204 by lifting a lower clamshell 204, thereby securing the camber tube of the manual wheelchair to the power add-on device 100. As illustrated, the upper clamshell 201 and a bottom clamshell 204 are attached by at least one hinge. As shown in FIG. 4, the latch 203 is in an open position. FIG. 5 illustrates the latch 203 in a closed position. FIG. 6 illustrates that the front castor wheel 107 can be lifted off the ground by this mechanism as well to provide extra clearance of obstacles.

Figure 7:
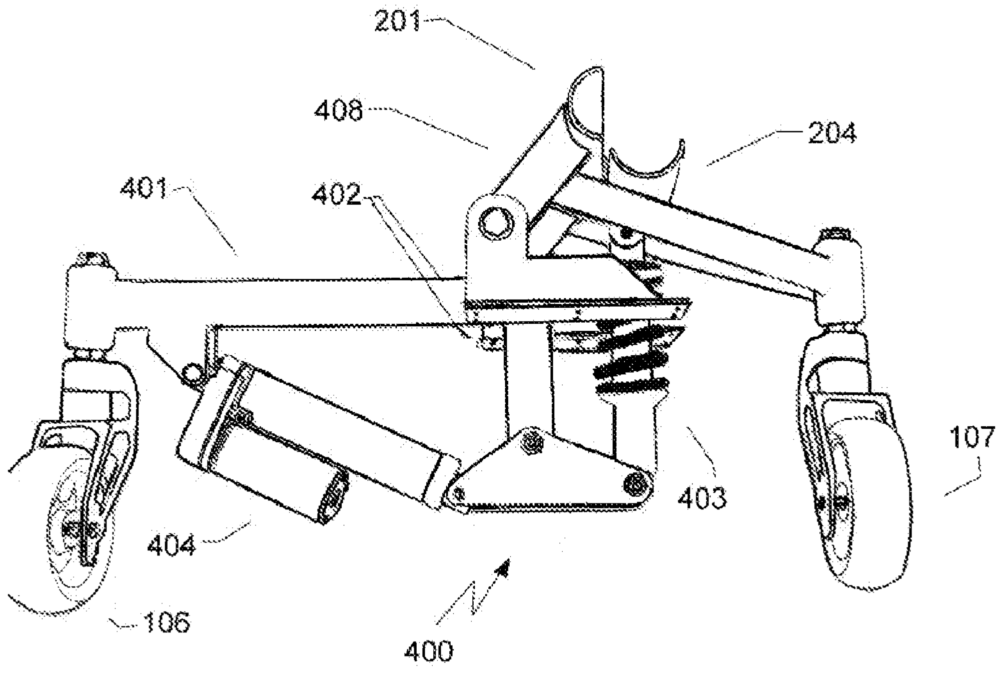
FIGS. 7 and 8 show the frame structure of the power add-on device of FIG. 4.
Figure 8:
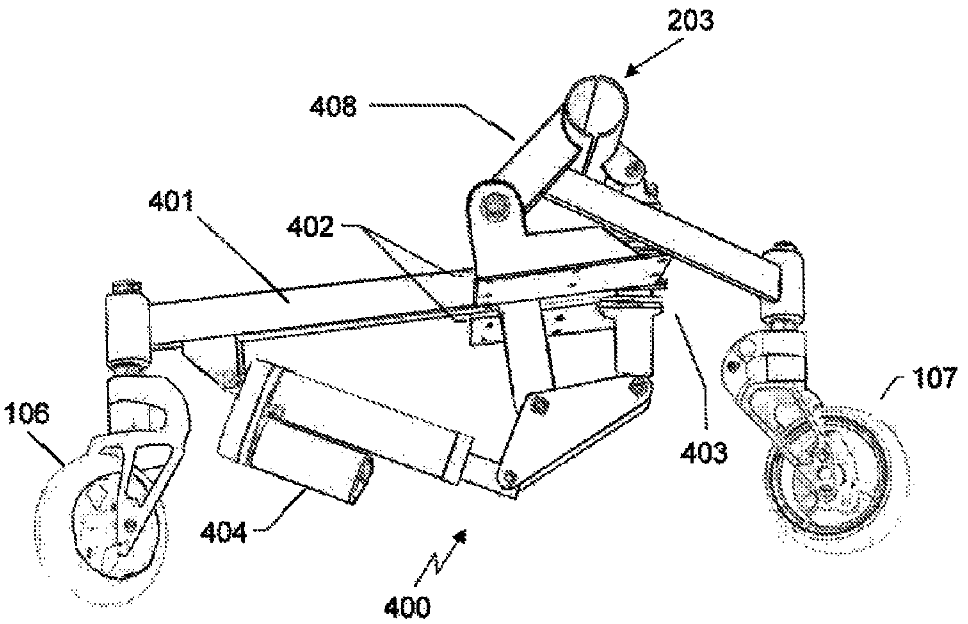

FIG. 7 illustrates the framing structure 400 of the power add-on device 100 with the alternate preferred latching mechanism discussed above. As depicted in FIG. 7, the electric actuator 404 is coupled to a pivot member 405, and the pivot member 405 is coupled to the coil-over shock absorber 403. In operation, as shown in FIG. 8, when the electric actuator 404 is activated, the electric actuator 404 applies force to the pivot member 405, and the pivot member 405 changes the direction of the force to upwardly apply the force to the coil-over shock absorber 403. As shown, the coil-over shock absorber 403 is coupled to the bottom clamshell 204, and the coil-over shock absorber 403 pushes the bottom clamshell 204 so as to close the latch 204.

Figure 9:
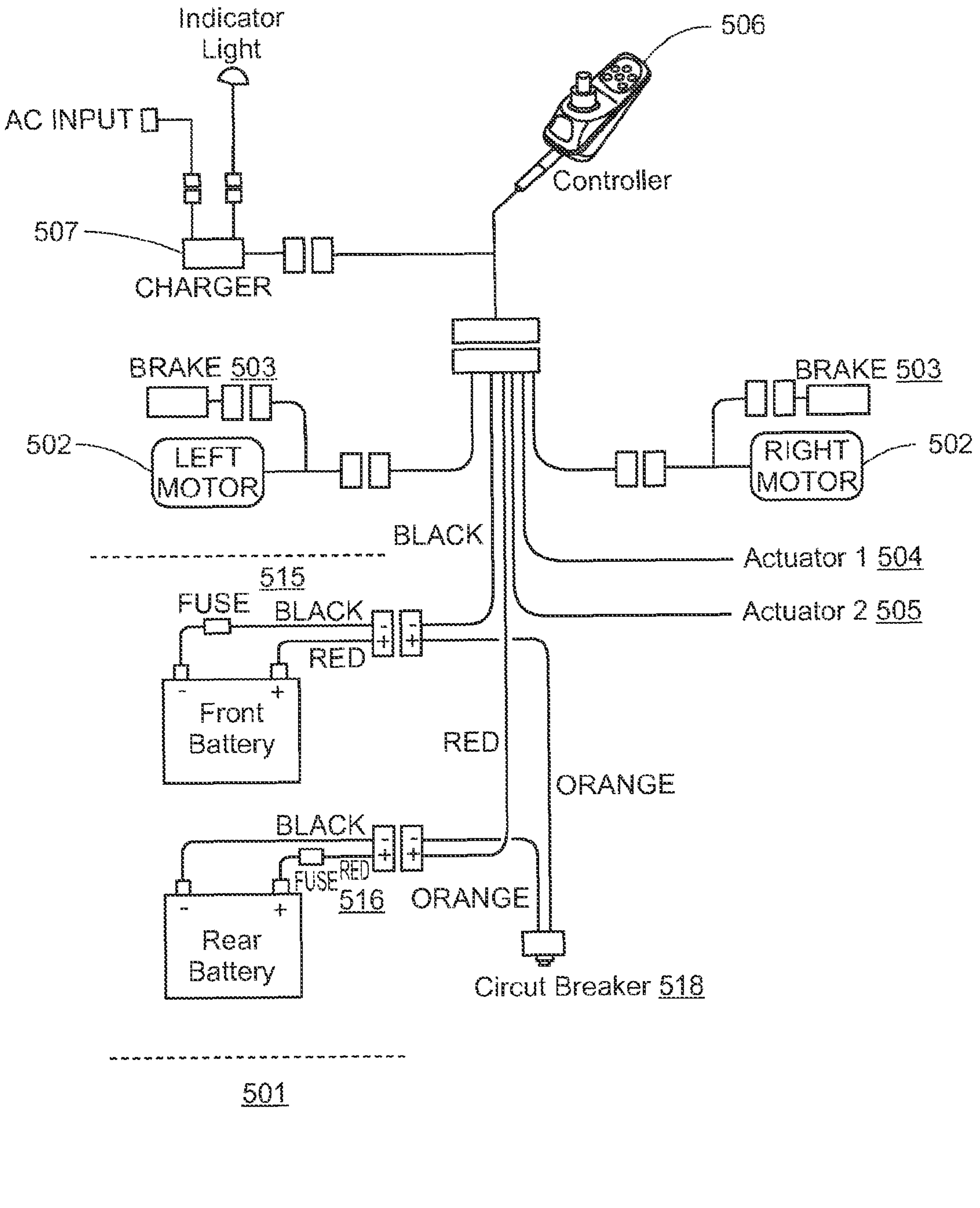
FIG. 9 shows a schematic view of the electrical components for the power add-on device.

FIG. 9 shows a schematic view of the electrical components for the power add-on device 100. As depicted in FIG. 5, the electrical system includes power source 501, motors 502, brakes 503, linear actuators 504, 505, controller 506, and charger 507.

The power source 501 comprises energy storage via batteries with charging and current limiting elements. The batteries are electrically connected in series, as shown, and provide all power for all functions. This configuration of battery power allows for use of standard batteries while providing the total output voltage needed for proper operation of the motors 502, actuators 503, 504, and brakes 503.

Since it is possible that either the motors 502 or the actuators 503, 504 can experience states of operation, such as short circuiting during a failure mode, which draw excessive power from the batteries, the batteries are each protected with current limiting elements. These current limiting elements comprise left battery fuse 515, right battery fuse 516, and circuit breaker 518. The circuit-opening characteristics of these current limiting elements preferably are selected based on allowing the circuit breaker first open-circuit followed by the fuses open-circuiting as the total current sourced from the batteries exceed the rated current discharge rate of the batteries.

The motors 502 are preferably direct current motors, sized preferably for propelling the manual wheelchair 201 and an adult user up at least a twenty degree grade. Similarly, the brakes are preferably direct-current-activated at the voltage of the two batteries when connected in series.

The actuator 504 is preferably a direct-current-powered actuator sized and preferably mounted under the frame so as to raise the swing arm 408, and thus lifting the rear of the manual wheelchair 201.

The actuator 505 is preferably a direct-current-powered actuator sized and preferably mounted so as to operate the latches 103, thereby releasing the wheelchair 201.

The controller 506 preferably includes wired or wireless remote actuator switches attached to a joystick/controller. Alternately, preferably, the actuator switches can be built into the joystick/controller. In either preferred configuration the actuator switches allow the operator to control the raising of the swing arm 408 (thus lifting the rear of the manual wheelchair 201), and operating the release lever (opening the latches 103 and releasing the manual chair 201), as shown.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A power add-on device for powering a manual wheelchair, comprising:

a support structure;

a motorized component supported by the support structure, the motorized component comprising dual electric motors and a power source configured to provide power to the electric motors;

a set of drive wheels supported by the support structure in communication with the motorized component;

an engagement mechanism configured to detachably couple the power add-on device to a camber tube that extends laterally between a first and a second rear wheel of the manual wheelchair; and a controller supported by the support structure configured to permit a user to control at least the motorized component of the power add-on device;

wherein:

the engagement mechanism is configured to move between a first position and a second position;

when the engagement mechanism is in the second position, at least a portion of the engagement mechanism is configured to surround a portion of the camber tube of the manual wheelchair, thereby removably coupling the power add-on device to the manual wheelchair; and each of the electric motors is configured to turn a respective one of the set of drive wheels to propel the manual wheelchair removably coupled with the power add-on device.

2. The power add-on device of claim 1, further comprising third wheel configured to contact a ground surface forward of the drive wheels and a fourth wheel configured to contact a ground surface aft of the drive wheels.

3. The power add-on device of claim 1, further comprising a set of armrests supported by the support structure, the armrests projecting forward of the drive wheels.

4. The power add-on device of claim 1, wherein the power add-on device is configured such that, when the engagement mechanism is in the second position, the camber tube of the manual wheelchair removably coupled with the engagement mechanism is permitted to substantially freely rotate relative to the engagement mechanism and the power add-on device, thereby permitting the manual wheelchair removably coupled with the power add-on device to substantially freely rotate relative to the power add-on device.

5. The power add-on device of claim 4, wherein the engagement mechanism allows the camber tube to rotate when the front wheels of the manual wheelchair are lifted.

6. The power add-on device of claim 1, comprising an actuator in communication with the engagement mechanism and configured to move the engagement mechanism between a raised and a lowered position.

7. The power add-on device of claim 1, wherein, the power add-on device is configured such that the drive wheels of the power add-on device substantially line up with a pair of rear wheels of the manual wheelchair when the power add-on device is removably coupled with the manual wheelchair such that an axial center of the drive wheels of the power add-on device substantially line up with an axial center of the wheels of the manual wheelchair when the power add-on device is removably coupled with the manual wheelchair.

8. The power add-on device of claim 1, wherein the engagement mechanism is further adapted to detach the power add-on device from the camber tube of the manual wheelchair.

9. The power add-on device of claim 1, comprising an electric actuator configured to move the engagement mechanism between the first position and the second position.

10. The power add-on device of claim 9, wherein the electric actuator is controlled by the controller.

11. The power add-on device of claim 1, wherein the engagement mechanism comprises a manual release.

12. The power add-on device of claim 1, wherein the engagement mechanism comprises a first engagement portion, a second engagement portion, and a hinge along at least a portion of an edge of the first engagement portion and the second engagement portion such that the engagement mechanism defines a clamshell arrangement, wherein at least one of the first engagement portion and the second engagement portion is configured to rotate relative to the other of the first engagement portion and the second engagement portion about the hinge to move the engagement mechanism between the first and the second position.

13. The power add-on device of claim 12, wherein the engagement mechanism comprises an upper clamshell portion and a lower clamshell portion, the upper clamshell portion and the lower clamshell portion being hingeably attached to one another.

14. The power add-on device of claim 12, wherein the first and second engagement portions are configured to surround at least a portion of the camber tube of the manual wheelchair when the engagement mechanism is in the second position.

15. The power add-on device of claim 1, wherein the controller is configured to permit a user to selectively move the engagement mechanism between the first and second positions.

16. The power add-on device of claim 1, wherein the power source comprises a battery.

17. The power add-on device of claim 1, comprising a shock absorber in communication with the engagement mechanism.

18. The power add-on device of claim 1, wherein the controller comprises a joystick configured to permit a user to control an operation of the motorized component.

19. The power add-on device of claim 1, comprising a third wheel configured to contact a ground surface forward of the drive wheels, the third wheel being movable between a raised and a lowered position.

20. A powered wheelchair system, comprising the power add-on device of claim 1 and a manual wheelchair having a camber tube.

21. A power add-on device for powering a manual wheelchair, comprising:

a support structure;

a set of drive wheels supported by the support structure;

a motorized component supported by the support structure, the motorized component comprising dual electric motors and a power source electrically coupled to the electric motors, wherein each of the electric motors is configured to turn a respective one of the set of drive wheels to propel the manual wheelchair removably coupled with the power add-on device;

an engagement mechanism configured to move between a first position and at least a second position and adapted to selectively and removably couple the power add-on device to the manual wheelchair when the engagement mechanism is in the second position; and an actuator in communication with the engagement mechanism;

wherein, when the power add-on device is coupled with the manual wheelchair having a pair of rear wheels coupled therewith, the actuator is configured to move a centerline of the engagement mechanism from a first vertical position relative to a ground surface to a second vertical position relative to the ground surface, the second position being further away from the ground surface than the first position, so as to raise the rear wheels of the manual wheelchair from a lowered position in which the manual wheelchair rear wheels are in contact with the ground surface to a raised position in which the rear wheels of the manual wheelchair are raised off of the ground surface.

22. The power add-on device of claim 21, wherein, when the engagement mechanism is in the second position, the engagement mechanism is configured to surround at least a portion of the wheelchair to removably couple the power add-on device thereto.

23. The power add-on device of claim 21, further comprising a controller configured to be manipulated by a user of the power add-on device, the controller being configured to at least control the actuator so that a user can manipulate the controller to move the engagement mechanism between the first position and at least the second position.

24. The power add-on device of claim 21, wherein, when the engagement mechanism is in the second position, the engagement mechanism is configured to surround at least a portion of a camber tube of the wheelchair to removably couple the power add-on device thereto.

25. The power add-on device of claim 21, comprising an actuator and a swing arm coupled with the engagement mechanism and the actuator, the swing arm being configured to move the engagement mechanism between the first position and at least the second position when moved by the actuator.

26. The power add-on device of claim 21, further comprising a third wheel configured to contact a ground surface forward of the drive wheels and a fourth wheel configured to contact a ground surface aft of the drive wheels.

27. The power add-on device of claim 21, further comprising a set of armrests supported by the support structure, the armrests projecting forward of the drive wheels.

28. The power add-on device of claim 21, wherein the power add-on device is configured such that, when the engagement mechanism is in the second position, the manual wheelchair removably coupled with the power add-on device is permitted to substantially freely rotate relative to the engagement mechanism and the power add-on device.

29. The power add-on device of claim 21, comprising an actuator in communication with the engagement mechanism and configured to move the engagement mechanism between the first and second positions.

30. The power add-on device of claim 21, wherein, the power add-on device is configured such that the drive wheels of the power add-on device substantially align with a pair of rear wheels of the manual wheelchair when the power add-on device is removably coupled with the manual wheelchair.

31. The power add-on device of claim 21, comprising an electric actuator configured to move the engagement mechanism between the first position and the second position.

32. The power add-on device of claim 21, wherein the engagement mechanism comprises a manual release configured to move the engagement mechanism to the first position.

33. The power add-on device of claim 21, wherein the engagement mechanism comprises a first engagement portion, a second engagement portion, and a hinge along an edge of the first engagement portion and the second engagement portion such that the engagement mechanism defines a clamshell arrangement, wherein at least one of the first engagement portion and the second engagement portion is configured to rotate relative to the other of the first engagement portion and the second engagement portion about the hinge to move the engagement mechanism between the first and the second position.

34. The power add-on device of claim 33, wherein the engagement mechanism comprises an upper clamshell portion and a lower clamshell portion, the upper clamshell portion and the lower clamshell portion hingeably attached to one another.

35. The power add-on device of claim 33, wherein the first and second engagement portions are configured to surround at least a portion of a camber tube of the manual wheelchair when the engagement mechanism is in the second position.

36. A powered wheelchair system, comprising the power add-on device of claim 21 and a manual wheelchair.

37. A power add-on device for powering a manual wheelchair having rear wheels, comprising:

a support structure;

a set of drive wheels supported by the support structure;

a motorized component supported by the support structure, the motorized component comprising dual electric motors and a power source electrically coupled to the electric motors, wherein each of the electric motors is configured to turn a respective one of a set of drive wheels to propel the manual wheelchair removably coupled with the power add-on device; and an engagement mechanism adapted to selectively and removably couple the power add-on device to a portion of the manual wheelchair, the engagement mechanism comprising a first clamshell portion and a second clamshell portion hingably coupled with the first clamshell portion;

wherein:

the engagement mechanism is configured to move between a first position and at least a second position; and when the engagement mechanism is in the second position, the engagement mechanism is configured to surround at least a portion of the manual wheelchair.

38. The power add-on device of claim 37, wherein the engagement mechanism is adapted to selectively and removably couple the power add-on device to a camber tube of the manual wheelchair.

39. The power add-on device of claim 37, further comprising a third wheel configured to contact a ground surface forward of the drive wheels and a fourth wheel configured to contact a ground surface aft of the drive wheels.

40. The power add-on device of claim 37, further comprising a set of armrests supported by the support structure, the armrests projecting forward of the drive wheels.

41. The power add-on device of claim 37, wherein the power add-on device is configured such that, when the engagement mechanism is in the second position, the manual wheelchair removably coupled with the power add-on device is permitted to substantially freely rotate relative to the engagement mechanism and the power add-on device.

42. The power add-on device of claim 37, comprising an actuator in communication with the engagement mechanism and configured to move the engagement mechanism between the first and second positions.

43. The power add-on device of claim 37, wherein, the power add-on device is configured such that the drive wheels of the power add-on device substantially align with the rear wheels of the manual wheelchair when the power add-on device is removably coupled with the manual wheelchair.

44. The power add-on device of claim 37, comprising an electric actuator configured to move the engagement mechanism between the first position and the second position.

45. The power add-on device of claim 37, wherein the engagement mechanism comprises a manual release configured to move the engagement mechanism to the first position.

46. The power add-on device of claim 37, wherein the first and second clamshell portions are configured to surround at least a portion of a camber tube of the manual wheelchair when the engagement mechanism is in the second position.

47. The power add-on device of claim 37, wherein the power add-on device is configured to raise and lower the rear wheels of the manual wheelchair.

48. The power add-on device of claim 37, comprising a swing arm coupled with the engagement mechanism and configured to move the engagement mechanism between a lowered position and a raised position to raise and lower the rear wheels of the manual wheelchair when moved by an actuator.

49. The power add-on device of claim 37, comprising a controller configured to permit a user of the power add-on device to at least move the engagement mechanism between the first position and at least the second position and to control an operation of the motorized component.

50. A powered wheelchair system, comprising the power add-on device of claim 37 and a manual wheelchair.

* * * * *